Patented Dec. 17, 1940

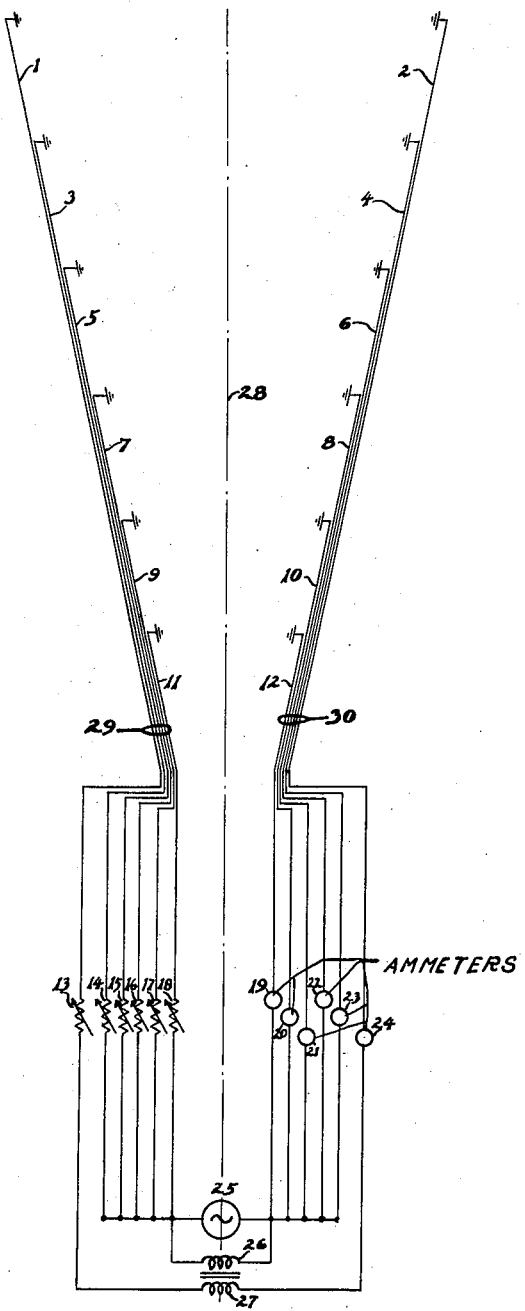

2,224,863

UNITED STATES PATENT OFFICE 2,224,863

BLIND LANDING EQUIPMENT

Edward N. Dingley, Jr., Arlington, Va.

Application March 21, 1938, Serial No. 197,225
11 Claims. (Cl. 177—352)

(Granted under the act of March 3, 1883, as
amended April 30, 1928; 370 O. G. 757)

My invention relates to an improved means for producing in space an electromagnetic field of which the locus of all points of constant field strength is a line in space of any desired curvature and making any desired angle with the earth.

One of the objects of my invention is to provide an improved means for setting up a magnetic field that may be used to guide an aircraft in landing, as described in my application Serial Number 191,735, filed February 21, 1938, for producing an electromagnetic glide path in space.

Other and further objects of my invention will be understood from the following specification and by reference to the accompanying drawing which shows one embodiment of my invention.

Conductors 1, 3, 5, 7, 9 and 11 represent part of the conductors contained in a multiconductor cable 29 and wherein conductors 2, 4, 6, 8, 10 and 12 represent part of the conductors contained in another multiconductor cable 30.

Cables 29 and 30 are shown placed on, under or above the surface of the earth on opposite sides of a landing runway 28. It is desirable, but not mandatory, that the cables 29 and 30 should each lie at an angle to the runway 28 equal to the desired vertical angle of the glide path and that they should converge at the point on the runway at which the airplane, in landing, is to contact the earth.

Conductors 1 and 2 are connected to the secondary 27 of a transformer, the primary 26 of which is connected to the source of alternating potential 25. The distant ends of conductors 1 and 2 are grounded as shown thus producing a horizontal triangular loop. The magnitude and phase of the current flowing through cables 1 and 2 are controlled by impedance 13 and the magnitude is measured by ammeter 24.

Conductors 3, 5, 7, 9 and 11 are connected through the variable impedances 14, 15, 16, 17 and 18 respectively to the source of alternating potential 25 and conductors 4, 6, 8, 10 and 11 are connected through the ammeters 19, 20, 21, 22, and 23 respectively to the source of alternating potential 25. Conductors 3 to 12 are cut to progressively diminishing lengths and their distant ends are grounded as shown.

Grounding conductors 3 to 12 at progressively spaced distances throughout the length of cables 29 and 30 makes them, in effect, horizontal triangular loops of progressively diminishing size which hereinafter are referred to as secondary loops whereas the loop formed by conductors 1 and 2 is hereinafter referred to as the primary loop. The number of secondary loops may be increased as desired to enhance the smoothness of the glide path.

In operation, the current I flowing through the primary loop is adjusted by any suitable means, such as impedance 13, to a value such that a desired electromagnetic field strength F is produced at a height $h$ vertically above the runway 28 in the vertical plane containing the ground points of cables 1 and 2. The height $h$ is preferably equal to the horizontal distance from the runway 28 to the grounding points of cables 1 and 2.

The currents in the secondary loops are adjusted to flow in phase opposition to the current flowing in the primary loop and ratios of the currents in the secondary loops to the current in the primary loop are adjusted to such values that the electromagnetic flux emanating from each of the cables 29 and 30 is caused to diminish as a linear function of the distance along the cables toward their point of convergence or, conversely, the point of constant electromagnetic field strength F vertically above the runway 28 is caused to diminish in altitude as a linear function of the distance along the runway toward the desired landing point.

The value of current flowing in each secondary loop may be adjusted to values other than those specified above, such as values proportional to the lengths of the respective conductors, in order to cause the electromagnetic field strength to vary in accordance with any other function of the distance along the cables 29 and 30.

The fluctuating magnetic field, set up as above described, is picked up by suitable inductive apparatus on an airplane and the resultant currents are applied to operate indicators that show whether the aircraft is following the glide path defined by the fields surrounding the two sets of cables, as set forth in my said copending application.

While the most convenient form of the present apparatus is made by cutting off the conductors of a cable to different lengths, as above set forth, it is obvious that it will be equally efficacious if separate conductors of suitable lengths be disposed adjacent and parallel to each other.

The invention described and claimed herein may be manufactured and used by the Government of the United States of America for governmental purposes without the payment of royalty thereon.

I claim:

1. Apparatus for setting up a magnetic field to define a landing path for aircraft, comprising a pair of cables disposed one on each side of an aircraft landing runway and converging toward the landing point, each said cable including a plurality of parallel conductors, all said conductors terminating at one end on a line through the landing point and substantially at right angles to said runway said conductors being of progressively diminished length in a direction toward said point, corresponding conductors of the cables being of the same length and the conductors of equal length in said cables being electrically united at their distant ends, means to supply low frequency alternating current to the said one end of the longest of said conductors at each side whereby a fluctuating magnetic field is set up therearound, and means to supply to the said one end of each other conductor in each cable a current of the same frequency as the aforesaid current but of opposite phase, the currents in said other conductors having a value that is to the value of the first mentioned current as the reciprocal of the number of said other conductors, whereby the resultant magnetic field diminishes toward the converging ends of said cable and the locus of points having a predetermined field strength is a line midway between said cables and of progressively diminishing height to define a glide path for landing an aircraft.

2. Apparatus for setting up a magnetic field to define a landing path for aircraft, comprising a pair of cables disposed one on each side of an aircraft landing runway and converging toward the landing point, each said cable including a plurality of parallel conductors, all said conductors terminating at one end on a line through the landing point and substantially at right angles to said runway said conductors being of progressively diminished length in a direction toward said point, corresponding conductors of the cables being of the same length and the conductors of equal length in said cables being electrically united at their distant ends, means to supply alternating current to the said one end of the longest of said conductors at each side whereby a fluctuating magnetic field is set up therearound, and means to supply to the said one end of each other conductor in each cable a current of the same frequency as the aforesaid current but of opposite phase, the currents in said other conductors having values that are proportional to the lengths of the conductors, whereby the resultant magnetic field diminishes toward the converging ends of said cables and the locus of points having a predetermined field strength is a line midway between said cables and of progressively diminishing height to define a glide path for landing an aircraft.

3. Apparatus for setting up a magnetic field to define a landing path for aircraft, comprising a plurality of parallel juxtaposed conductors on each side of an aircraft landing runway and the groups of said conductors converging toward the landing point, all said conductors terminating at one end on a line through said landing point and substantially at right angles to said runway, said conductors on each side being of progressively diminished length in a direction toward said point, corresponding conductors of the cables being of the same length and the conductors of equal length in said cables being electrically united at their distant ends, means to supply low frequency alternating current to the said one end of the longest conductor on each said side whereby a fluctuating magnetic field is set up therearound, and means to supply to the said one end of each other conductor on each side a current of the same frequency as the aforesaid current but opposite in phase, the currents in said other conductors having a value that is to the value of the first mentioned current as the reciprocal of the number of said other conductors, whereby the resultant magnetic field diminishes toward the converging ends of said conductors and the locus of points having a predetermined field strength is a line midway between the groups of conductors and of progressively diminishing height to define a glide path for landing an aircraft.

4. Apparatus for setting up a magnetic field to define a landing path for aircraft, comprising a plurality of parallel juxtaposed conductors on each side of an aircraft landing runway and the groups of said conductors converging toward the landing point, all said conductors terminating at one end on a line through said landing point and substantially at right angles to said runway, said conductors on each side being of progressively diminished length in a direction toward said point, corresponding conductors of the cables being of the same length and the conductors of equal length in said cables being united at their distant ends, means to supply alternating current to the said one end of the longest conductor on each said side whereby a fluctuating magnetic field is set up therearound, and means to supply to the said one end of each other conductor on each side a current of the same frequency as the aforesaid current but opposite in phase, the currents in said other conductors having values that are proportional to the lengths of respective conductors, whereby the resultant magnetic field diminishes toward the converging ends of said conductors and the locus of points having a predetermined field strength is a line midway between the groups of conductors and of progressively diminishing height to define a glide path for landing an aircraft.

5. Apparatus for setting up a magnetic field to define a landing path for aircraft, comprising a pair of cables disposed one on each side of an aircraft landing runway and converging toward the landing point, all said conductors terminating at one end on a line through said landing point and substantially at right angles to said runway, each said cable including a plurality of parallel conductors, said conductors being of progressively diminished length in equal decrements in a direction toward said point, corresponding conductors of the cables being of the same length, means electrically uniting the respective distant ends of the conductors of equal length, means to supply low frequency alternating current to the said one end of the longest of said conductors at each side whereby a fluctuating magnetic field is set up therearound, and means to supply to the other end of each said one conductor in each cable a current of the same frequency as the aforesaid current but of opposite phase, the currents in said other conductors having values that are proportional to the lengths of the respective conductors, whereby the resultant magnetic field diminishes toward the converging ends of said cables and the locus of points having a predetermined field strength is a line midway between said cables and of progressively diminishing height to define a glide path for landing an aircraft.

6. Apparatus for setting up a magnetic field to define a landing path for aircraft, comprising a plurality of parallel juxtaposed conductors on each side of an aircraft landing runway and the groups of said conductors converging toward the landing point, all said conductors terminating at one end on a line through said landing point and substantially at right angles to said runway, said conductors on each side being of progressively diminished length in a direction toward said point, corresponding conductors of the cables being of the same length, means electrically uniting the respective distant ends of the conductors of equal length, means to supply low frequency alternating current to the said one end of the longest conductor on each said side whereby a fluctuating magnetic field is set up therearound, and means to supply to the said one end of each other conductor on each side a current of the same frequency as the aforesaid current but opposite in phase, the currents in said other conductors having a value that is to the value of the first mentioned current as the reciprocal of the number of said other conductors, whereby the resultant magnetic field diminishes toward the converging ends of said conductors and the locus of points having a predetermined field strength is a line midway between the groups of conductors and of progressively diminishing height to define a glide path for landing an aircraft.

7. Apparatus for setting up a magnetic field to define a landing path for aircraft, comprising a plurality of parallel juxtaposed conductors on each side of an aircraft landing runway and the groups of said conductors converging toward the landing point, all said conductors terminating at one end on a line through said landing point and substantially at right angles to said runway, said conductors on each side decreasing in length toward said converging ends according to a predetermined function, corresponding conductors of the cables being of the same length, means electrically uniting the respective distant ends of the conductors of equal length, means to supply alternating current to the said one end of the longest conductor on each side whereby a fluctuating magnetic field is set up therearound, and means to supply to the said one end of each other conductor on each side a current of the same frequency as the aforesaid current but opposite in phase, the currents in said other conductors having a value that is to the value of the first mentioned current as the reciprocal of the number of said other conductors, whereby the resultant magnetic field diminishes toward the said converging ends according to a predetermined function.

8. Means for setting up a magnetic field around a line on each side of an aircraft landing runway, said lines converging toward and terminating at one end of said runway, and means for setting up other magnetic fields about the said line on each said side in opposition to the first mentioned said fields, said other fields being of increasing strength toward said converging ends, whereby the resultant field is of progressively diminishing strength toward said converging ends.

9. Means for setting up a magnetic field around a line on each side of an aircraft landing runway, and means for setting up other magnetic fields about the said line on each said side in opposition to the first mentioned said fields, said other fields being of progressively increasing strength toward an end of said runway, whereby the resultant field is of progressively diminishing strength toward said end of the runway.

10. Apparatus for producing a magnetic field to define a landing path for aircraft, comprising a pair of cables disposed one on each side of an aircraft landing runway to converge toward the landing point and each having an open end substantially on a line through said point and normal to said runway, each said cable including a plurality of parallel conductors, said conductors being of progressively differing lengths as measured from the landing point, each conductor of one of said cables being the same length as a corresponding conductor of the other of said cables, and the conductors of equal lengths in said cables being electrically united at their ends most distant from the landing point to form a plurality of horizontal loop circuits of progressively differing lengths as measured along the runway from the landing point, means to supply alternating current to the open ends of the longest of said loop circuits whereby an alternating magnetic field is produced therearound and means to supply to the open ends of the others of said loop circuits currents of the same frequency as the aforesaid current but of opposite phase, the ratios of the currents in said other loop circuits to the current in said longest loop circuit being such that the resultant magnetic field surrounding said cables diminishes toward the converging ends of said cables and the locus of points having a predetermined field strength contributed equally from each cable is a line midway between said cables and of progressively diminishing height to define a glide path for landing an aircraft.

11. Apparatus for producing a magnetic field to define a landing path for aircraft, comprising a first plurality of parallel conductors on one side of an aircraft landing runway and a second plurality of parallel conductors on the other side of said aircraft landing runway, the first and second pluralities of parallel conductors converging toward and having an open end adjacent to the landing point, the conductors of each of the pluralities of parallel conductors being of progressively graduated lengths as measured from the landing point, each conductor of the first said plurality of conductors having the same length as a corresponding conductor of the second said plurality of conductors, and the conductors of equal lengths being electrically united at their ends most distant from the landing point to form a plurality of horizontal loop circuits of progressively graduated lengths as measured along the runway from their open ends at the landing point, means to supply alternating current to the open ends of the longest of said loop circuits whereby an alternating magnetic field is produced therearound and means to supply to the open ends of the others of said loop circuits currents of the same frequency as the aforesaid current but of opposite phase, the ratios of the currents in said other loop circuits to the current in said longest loop circuit being such that the resultant magnetic field surrounding each said plurality of parallel conductors diminishes toward the converging ends of said pluralities of parallel conductors and the locus of points having a predetermined field strength contributed equally from each of said pluralities of parallel conductors is a line midway between said first and second pluralities of parallel conductors and of progressively diminishing height to define a glide path for landing an aircraft.

EDWARD N. DINGLEY, Jr.